INVENTORS
PAUL H. GIROUX
ROBERT J. URQUHART
BY
Paul D. Carmichael
ATTORNEY

United States Patent Office 3,274,559

Patented Sept. 20, 1966

3,274,559

APPARATUS FOR TRANSFERRING DATA

Paul H. Giroux and Robert J. Urquhart, both of Endicott, N.Y., assignors to International Business Machines Corporation, New York, N.Y., a corporation of New York Filed Dec. 4, 1961, Ser. No. 156,825
1 Claim. (Cl. 340—172.5)

The present invention relates generally to the data processing arts and more particularly to an apparatus for transferring data between various data processing apparatus.

Digital computers are widely employed for processing data or information. A typical digital computer will comprise a central processing unit and a plurality of peripheral input and output devices. The input devices supply the necessary data to the central processing unit while the output devices record or otherwise translate into a usable form the data coming from the central processing unit. Examples of input devices are card readers, magnetic tape units, condition sensing elements in combination with analog-to-digital converters, etc., while output devices are exemplified by card punches, terminal transmission apparatus, condition control devices, magnetic tape units, etc.

The central processing unit of a digital computer is inherently a fast operating device—being constructed of electronic components and utilizing magnetic drums, magnetic cores, electrostatic storage tubes or the like for its internal memory. For example, the central processing unit of one large scale digital computing system is capable of performing in excess of 100,000 operations per second. Considerable effort is being expended in the data processing arts to develop central processing units which operate at higher speeds. In contrast, many of the input and output devices operate at relatively low speeds. A typical card punch will process on the order of 200–300 cards per minute.

It is becoming common practice in the data processing arts to interconnect via communication links a plurality of digital computers or the peripheral input-output devices therefor positioned at different locations. In such a data processing system, the apparatus communicate back and forth whereby maximum utilization is made of all system components and the system requirements are met. Efficient use of the transmission links or media may require that the data be transmitted at a slower or faster rate than the operating speeds of the interconnected system components. If the transmission medium is the atmosphere and the communication link extends over a considerable distance, the data may be transferred at a relatively slow rate to maintain the band width and power requirements within reasonable limits. Alternatively, if common carrier lines define the transmission link, the rate of transmission may be much faster than the operating speeds of the data processing apparatus to insure maximum utilization of the common carrier facilities.

The above and other considerations require apparatus for and methods of transferring data between various portions of a data processing system which operate at different speeds. Various priority schemes and elaborate buffering arrangements have been used for this purpose. One priority scheme is for the arithmetic units and the memory of a computer to service first the slowest of a plurality of peripheral input-output devices. Intermediate buffering systems employing registers or other temporary storage means *to* compress or expand the data with respect to time have also been used. Such techniques, although widely employed, are, in many cases, inadequate for the purposes intended and are characterized by their complexity and high cost. Considerable apparatus is required to generate the various and many timing or synchronizing signals and to provide auxiliary temporary storage means.

Briefly, this invention provides highly simplified and improved apparatus for transferring data between data processing devices which are operating at different speeds. A cyclic storage means having a capacity equal to the amount of data to be transferred during a transfer operation interconnects a first device operating at a first rate and a second device operating at a second rate. The cyclic storage means comprises a time delay storage device such as a magnetostrictive delay line or the like. Means are provided for introducing data into the time delay storage device at a certain time and for sensing such data at a predetermined later time. The time delay storage device operates at a preselected rate and there is a time interval between the introduction of data thereinto and the sensing of this same data. The first device operating at a first speed is interconnected with the means to introduce while the sensing means is connected by circuitry to the second device operating at a second speed. The first device may be operating at a faster or slower rate than the second device. The sensing means is also interconnected with the means for introducing so that the data in the time delay storage device is circulated in a cyclic manner during a data transfer operation.

The circuitry interconnecting the sensing means and the second device comprises gating means controlled by the timing of the second device so that selected ones of the information quantities or bits of the data in the time delay storage device may be transferred at desired times to the second device. The time delay storage device operates at a rate which is at least equal to the rate of operation of the first device whereby data is loaded into the time delay storage device or is supplied to the first device at the speed of operation of this first device. The data appearing at the sensing means is presented and/or is sampled at a rate which is a binary division (high speed to low speed) or multiplication (low speed to high speed) of the cyclic rate of the time delay storage device and the first device plus or minus an incremental difference equal to the time interval represented by one or more bits of information quantities of the data in the temporary storage device. A bit or series of bits is sampled for each cyclic passage of the data in the time delay storage device past the sensing means. If the second device operates at a rate which is an exact binary multiple or divisor of the rate of the time delay storage device, the sampled bits or series of bits are transmitted directly to the second device.

In one embodiment of the invention the length or the bit capacity of the cyclic storage means remains fixed during a transfer operation and the sampling is accomplished by gating signals corresponding to the rate above defined. In another embodiment of the invention the length or capacity of the time delay storage device is cyclically changed in accordance with a preselected pattern and the sampling occurs by gating the sensing means at a rate which is an exact multiple or divisor of the rate of the first device. Means are provided for changing the capacity of the time delay storage device in such a manner that no portion of the information in the storage device is lost, destroyed and/or unavailable at the required time. The controlled changing of the capacity of the time delay storage device, in combination with the bistable storage device described above, provides apparatus that is capable of interconnecting first and second devices which may be operating at any of an unlimited number of rate or frequency ratios.

The timed delay device may be an integral portion (such as the internal memory or an operating register) of the first device with the second device sending and receiving information quantities. Alternatively, the first device may provide data inputs to the time delay storage device while outputs for the second device are taken from the sensing means. The apparatus is highly versatile and complicated auxiliary buffering means are not required.

The primary or ultimate object of the invention is to provide improved apparatus for transferring data between data processing apparatus operating at different rates.

Another object of the invention is to provide apparatus for transferring data between processing apparatus operating at different rates which is highly simplified and requires a minimum of components. The transfer apparatus includes a cyclic storage means and data may be supplied to or introduced directly from a first device and taken directly by a second device without the need of complicated ancillary buffering equipment. The cyclic storage means may define a portion, such as a register, of one or both of the devices on a time shared basis. Means are provided for preventing the loss of a single bit of information when the length or time delay of the cyclic storage means is changed.

Yet another object of the invention is to provide transferring apparatus for interconnecting data processing apparatus which may be operating at almost any ratio of operating rates or frequencies. Means are provided for changing the length or effective time delay of the cyclic storage means in accordance with a preselected pattern during a transfer operation.

The foregoing and other objects, features and advantages will be apparent from the following more particular description of preferred embodiments of the invention, as illustrated in the accompanying drawings.

*Introduction*

Figure 2:
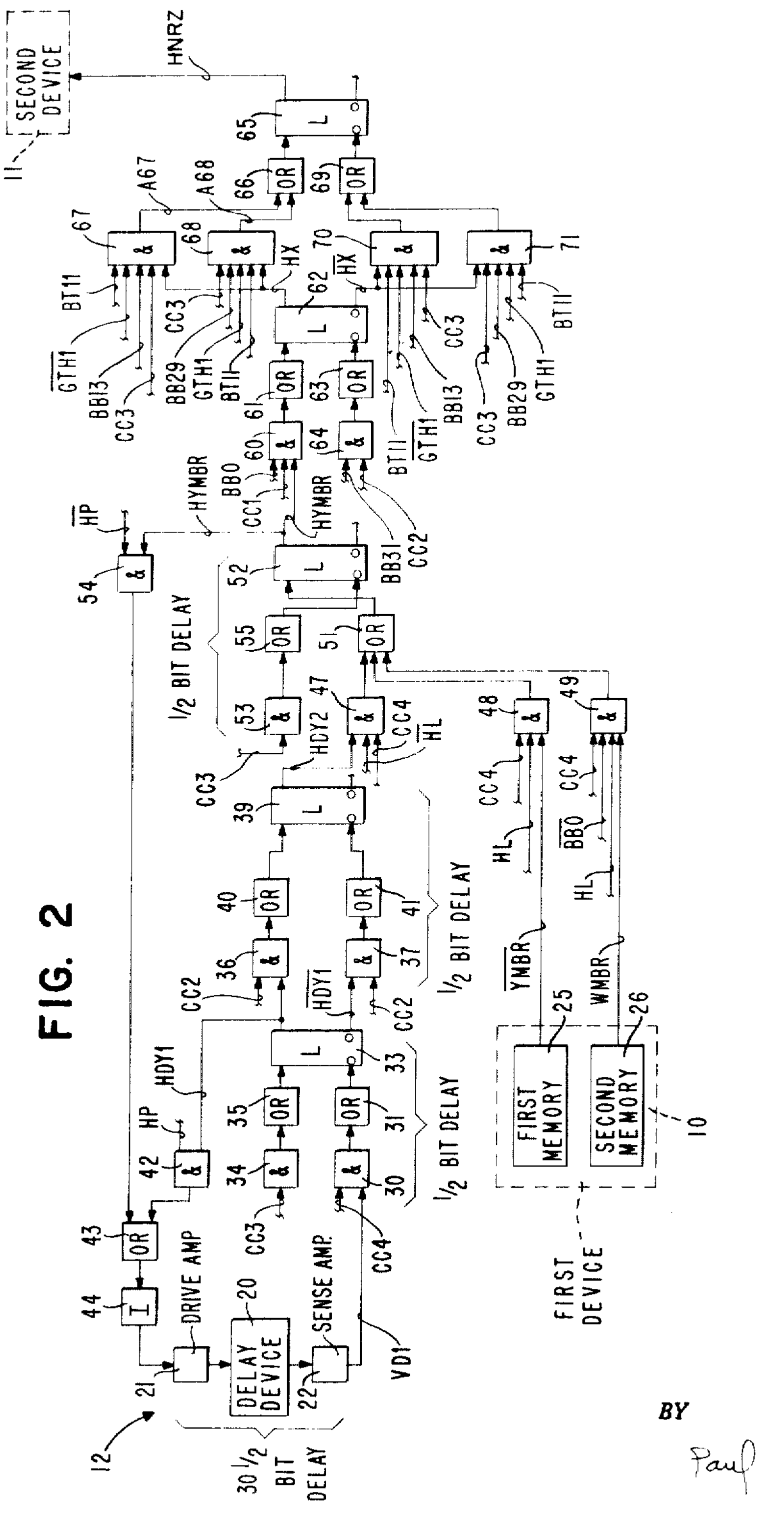
FIGURE 2 is a schematic circuit diagram of the data transferring aparatus shown in FIGURE 1.
Figure 1:
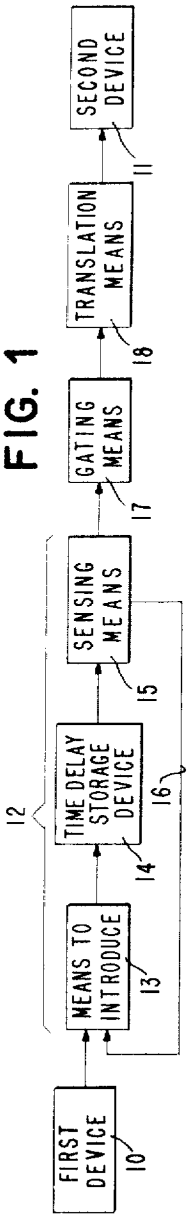
FIGURE 1 is a block diagram of data transferring apparatus constructed in accordance with and employing the teachings of the present invention.
Figure 3:
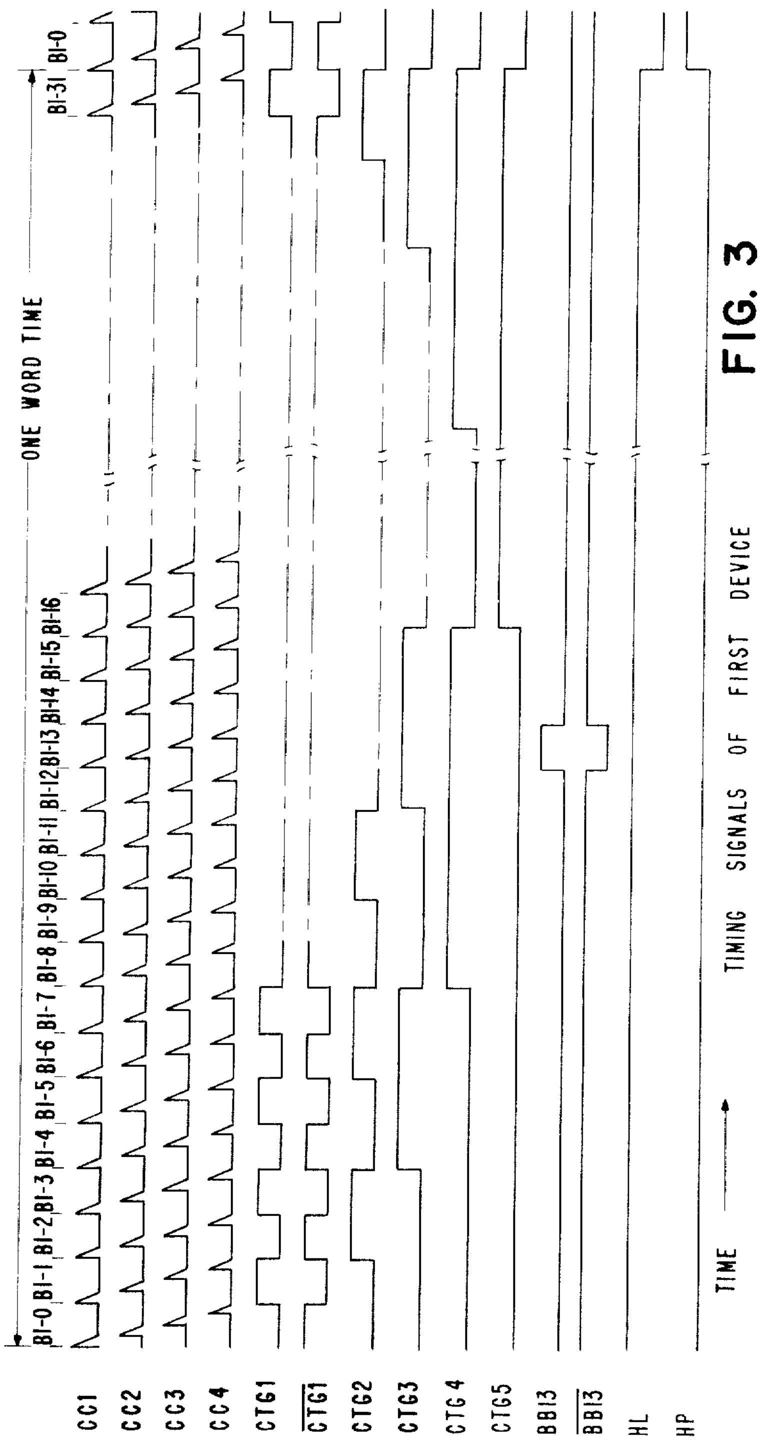
FIGURE 3 is a timing or sequence chart illustrating various timing signals of the first device.

Throughout the following description and in the accompanying drawings there are certain conventions employed which are familiar to those skilled in the art. Additional information concerning these conventions are as follows:

Bold-face characters appearing within a block symbol of a logic circuit identify the common name of the circuit represented. The character & designates a logic block performing Boolean multiplication in that no output is present unless and until signals are simultaneously present on each input thereof. The Or logic block is indicated by the symbol OR. This type of logic block performs Boolean addition whereby an output is present when a signal is applied to any of the various inputs thereof. Inverters, which perform the Boolean inversion and a power driving function, are indicated by the symbol I.

The latches L are binary storage devices settable in either of two stable states. Each latch has set and reset input conductors and corresponding output conductors. The reset sides of the latches are indicated by the circles within the logic blocks. When an input signal is applied to the set input conductor the latch is set to one of its bistable states in accordance with the input signal. Further input signals of the same type applied to the set input conductor will not change the state of the latch. However, an input signal applied to the reset input conductor will cause the latch to shift back to its original bistable state. A more complete description of the logical operation of such a bistable device is found on pages 47–50 of a book by R. K. Richards, entitled "Arithmetic Operations in Digital Computers" and published in 1955 by D. Van Nostrand Company, Inc.

It will be understood that any of a number of various circuit designs can be employed for performing the logical functions above described. Further such circuits may operate on either positive or negative pulse logic. The disclosed embodiments of the invention will be described in connection with positive pulse logic—i.e., the up level defines the binary one while the down level defines the binary zero. Single input OR logic blocks are employed in certain instances to drive the set or reset inputs of latches. These OR blocks do not perform a logical function but are necessary to satisfy the requirements of the particular type of logic circuitry used. Such logic blocks could be deleted when other types of logic circuitry are employed.

To facilitate the understanding and description of the invention, the various embodiments will be described individually with respect both to the manner of construction and overall operation. The description of the embodiments will be followed by a general discussion of the invention.

*First embodiment*

A first embodiment of the invention is shown in FIGURES 1–5 of the drawings. This apparatus is used for transferring data from a first device 10 operating at a first speed to second device 11 operating at a second speed. The transferring apparatus comprises a cyclic storage means 12 having a means to introduce 13, a time delay storage device 14 and a sensing means 15 connected in series relation. Data is supplied from the first device 10 to the cyclic storage means 12 and is loaded into the time delay storage device 14 at the beginning of a transfer operation. The data in the time delay storage device 14 is available at the sensing means 15 a predetermined time interval after the data has been introduced into this device. The output of the sensing means 15 is returned over path 16 to the means to introduce 13.

The output of the sensing means 15 is periodically sampled by gating means 17 and the sampled data is transferred to translation means 18 where the same is made available to the second device 11. The sensing means 15 is sampled once each time the data has been cycled through the storage means. Means are provided for changing the time delay or length of the storage means so that the same or different bits of the data are sampled by the gating means upon successive cycles of the data through the storage means. The translation means 18 performs a vernier or fine timing translation and matches the output of the gating means 17 with the rate of operation of the second device 11.

Referring now to FIGURE 2 of the drawings, the cyclic storage means 12 comprises a magnetostrictive delay line 20 and associated drive and sense amplifiers 21 and 22 connected at the opposite ends thereof. The magnetostrictive delay line is a temporary storage device and may consist of a ribbon of magnetostrictive material attached to the periphery of a torsional wire normal to the axis of the wire. Contraction or expansion of the magnetostrictive material under the influence of a change in magnetic field imparts a torsional motion to the wire. Delay lines of this type are well known in the art and more information concerning the same is contained in an article by R. C. Williams, entitled "Theory of Magnetostrictive Delay Lines for Pulse and Continuous Transmission," published by the Institute of Radio Engineers in the February 1959, Transactions on Ultrasonic Engineering.

While magnetostrictive delay lines are disclosed in connection with the illustrated embodiments of the invention, it should be clearly understood that other types of time delay devices can be employed. However, the magnetostrictive delay line is ideally suited for the present application since the same is relatively compact, has no moving parts, is rugged and highly stable and high pulse repetition rates can be obtained.

Before proceeding further with the description, it is necessary to consider certain characteristics of and the timing of the first and second devices. For purposes of illustration, it will be assumed that the first device 10 is of a digital processor having a pair of internal memories 25 and 26 which operate at fifty kilocycles per second. A bit of binary information is represented by the presence or absence of a pulse in the time interval corresponding to one period of a fifty kilocycle signal. The presence of a signal in this time interval represents the binary one while the absence of a signal indicates the binary zero. It is desired to transfer data from either of the internal memories 25 and 26 to the second device.

Figure 4:
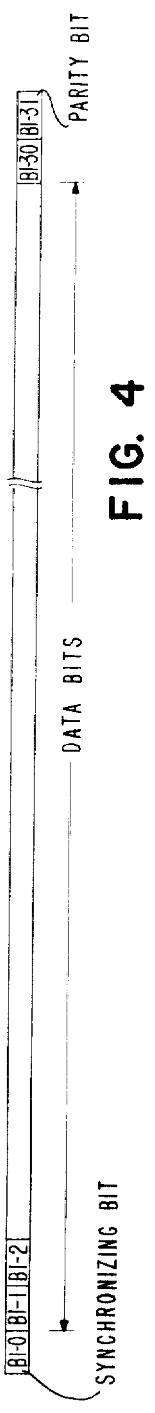
FIGURE 4 is a diagram of one word of the first device.

In accordance with usual practice, the bits of binary information in the memories 25 and 26 are grouped in serial trains or words of predetermined length. A word for the first device consists of thiryt-two bits of binary information. These bits are designated by the reference indicia B1–0 to B1–31 as shown in FIGURE 4 of the drawings. The quantities represented by a bit or series of bits within each word are selected in accordance with the requirements of the first device. For example, bit B1–0 may be used for synchronizing purposes, bits B1–1 to B1–30 may contain the actual data and bit B1–31 may be the parity or error checking bit.

The timing for the first device 10 comprises clock pulses CC1–CC4. The CC1 signal provides a positive pulse at the beginning of each and every bit time during the operation of the first device. A positive timing pulse CC2 occurs at the end of each timing pulse CC1 and the same relationship is maintained between timing pulse CC2–CC3 and CC3–CC4. One of each of the timing pulses CC1–CC4 occurs during each bit time.

Timing signals CTG1–CTG5 and the inverse thereof ($\overline{\text{CTG1}}$–$\overline{\text{CTG5}}$) are provided. The timing signal CTG1 is at a positive level during alternate bit times while the timing signal CTG2 is at a positive level for alternate periods of two bit times. An examination of the timing chart will indicate that the timing signals CTG1–CTG5 are binarily related. Thus, the signal CTG3 is at the positive level for alternate series of four bit times, CTG4 is at the positive level for alternate series of eight bit times and CTG5 is at the positive level for sixteen bit times or one-half of each word time. When the CTG1 signal is at the positive level, the $\overline{\text{CTG1}}$ signal is at the zero level. The $\overline{\text{CTG1}}$ signal is the mirror image or inverse of the timing signal CTG1. The inverse of each timing signal is available although only the inverted signal $\overline{\text{CTG1}}$ is shown.

The various timing signals CTG1–CTG5 and $\overline{\text{CTG1}}$–$\overline{\text{CTG5}}$ can be combined in conventional logic circuits to provide gating signals representing a given bit time in any word time. These gating signals are indicated by the reference indicia BB followed by a numeral corresponding to the bit position. For example, the signal BB13 is at a positive level only during bit time B1–13 and is provided by combining the signals CTG1, $\overline{\text{CTG2}}$, CTG3, CTG4, and $\overline{\text{CTG5}}$. The inverse of the signal is obtained through the use of an inverter or by combining the inverse of the above signals. Only gating signals BB13 and $\overline{\text{BB13}}$ have been shown on the timing chart of FIGURE 3 although all of the gating signals BB0–BB31 and the inverse thereof are available. The above timing signals are employed internally of the first device and are readily available for use with the transferring apparatus.

The second device may comprise terminal communication apparatus and it will be assumed that the same operates at a rate of 1.042 kilocycles per second. Timing signals for the second device are depicted on the timing chart of FIGURE 5. The basic data word for the second device is the same as the data word for the first device and has thirty-two bits, B2–0 to B2–31. Each of these bits occurs in a time interval corresponding to one period of a 1.042 kilocycle per second signal. The first device operates at a speed which is forty-eight times greater than the speed of operation of the second device.

The basic timing signals for the second device are BT11 and GTH1–GTH5 and the inverse thereof. The signal BT11 occurs at a 1.042 kilocycle rate and is at alternate positive and negative levels for half bit intervals for each of the bit times B2–0 to B2–31. The signals GTH1–GTH5 are binarily related to the rate of operation of the second device and correspond generally to the timing signals CTG1–CTG5 associated with the first device. The inverse timing signal $\overline{\text{GTH1}}$ is shown on the timing chart of FIGURE 5 and the inverse signals of the other timing signals for the second device are also available.

Several additional signals, which perform a command function in controlling the operation of the transferring apparatus, are provided. The command signals HL and $\overline{\text{HL}}$ control the flow or loading or information from the first device into the transferring apparatus. The HL signal is at the binary one or positive voltage level during a portion of bit time B2–0 for each word time of the second device. The signal HL remains at the positive level for the first two-thirds of bit time B2–0. This time interval corresponds exactly to one word time (bit times B1–0 to B1–31) of the first device.

Another command signal is HP which is employed to change the effective length or time delay of the cyclic storage means in accordance with a preselected pattern. The HP signal is at a positive level for the latter two-thirds of each two bit times of the second device. The HP signal is also related to the timing of the first device and is at the positive level for two out of three word times with respect thereto. The inverse of this signal or $\overline{\text{HP}}$ is also available.

Returning to FIGURE 2 of the drawings, the output signal VD1 from the sense amplifier 22 is combined with timing signals CC4 in And logic block 30 whose output is applied through Or logic block 31 to the reset input of latch 33. The set input of this latch is driven by the timing signal CC3 acting through series connected And block 34 and Or block 35. Each bit of the data in the delay line, as provided by the sense amplifier 22 at the fifty kilocycle rate, is available in serial fashion in latch 33 during the interval between timing signal CC4 of a first bit time and signal CC3 of the succeeding bit time. The latch 33 operates at a fifty kilocycle rate and the output signals HDY1 and $\overline{\text{HDY1}}$ represent the information in the delay line.

The output signals from latch 33 are combined with timing signal CC2 in And logic blocks 36 and 37 and are supplied to the inputs of a latch 39 via Or logic blocks 40 and 41. The HDY1 signal also serves as one input to And logic block 42. The other input to this logic block is the command signal HP. The output of And block 42 is transferred through Or block 43 and inverter 44 to the drive amplifier 21.

The cyclic storage means operates at the rate of the first device and has a length or delay time equal to thirty and one-half bit times. A single bit of information introduced into the cyclic storage means by the Or block 43 will appear at the output of the sense amplifier 22 exactly thirty and one-half bit times later. The latches 33 and 39 and the input gating circuitry associated therewith each provide an additional one-half bit time delay for the information supplied thereto. Therefore, a bit of information introduced into the cyclic storage means will be available in the latch 33 exactly thirty-one bit times later and available in the latch 39 after a delay of thirty-one and one-half bit times.

The And block 42, Or block 43 and inverter 44 provide a return path in parallel around the delay line 20 and latch 33 for introducing data back into the delay line. When the And block 42 is enabled (the command signal HP is at the positive level), a circulating path is completed for the data in the transferring apparatus having an overall time delay equal to thirty-one bit times of the first operating device.

The set output signal HDY2 of latch 39 and signals CC4 and $\overline{HL}$ are combined in And logic block 47. A data containing signal $\overline{YMBR}$ of the first memory 25 of the first device and the signal CC4 and HL provides inputs to And logic block 48. In a similar manner, the data output signal (WMBR) of the second memory 26 of the first device and the signals CC4, $\overline{BB0}$ and HL define the inputs to And logic block 49. The outputs of And logic blocks 47–49 are applied through Or logic block 51 to the reset input of latch 52. The reset input of latch 52 is energized by the timing signal CC3 acting through And block 53 and Or block 55. Whether data is supplied to Or block 51 from the first or second memory is controlled by timing means associated with the first device, not shown. Only one of the devices supplies data to this Or block at any one time.

The data supplied to the latch 52 is controlled by command signals HL and $\overline{HL}$. When data is to be loaded into the transferring apparatus from the first device, the HL signal is at the positive level. At all other times, the data in latch 39 is transferred to latch 52. The latch 52 and the input gating circuitry therefor provide a one-half bit time delay. Data introduced into the cyclic storage means will appear in latch 52 exactly thirty-two bit times or one word time later as related to the operating speed of the first device provided, of course, that data is not being loaded into the delay line from this first device.

The set output signal HYMBR of latch 52 provides one input to And logic block 54 and the other input thereto is the command signal $\overline{HP}$. The output of And logic block 54 is transmitted via Or block 43 and inverter 44 to the drive amplifier 21 of the delay line 20. The command signal HP controls the effective total delay time or length of the cyclic storage means. When the HP signal is at the positive level, the return data path is completed through And block 42 and the total delay of the system is thirty-one bit times of the first operating device. However, when the command signal HP is at the binary zero level, the return path for the data includes latches 39 and 52 and the And block 54 for a total time delay of thirty-two bit times or one word time of the first device.

The signal HYMBR from the latch 52 is combined in And logic block 60 and applied through Or block 61 to the set input latch 62. The reset input of latch 62 is connected through Or block 63 to the output of And block 64. The inputs to And block 64 are timing signals CC2 and BB31 whereby the latch 62 is reset near the end of each word time of the first device. The latch 62 is set in accordance with the binary information contained in the signal HYMBR during each word time of the first device. The binary information comes either from one of the memories of the first device or the delay line depending on the condition of the command signals HL and $\overline{HL}$.

As previously mentioned, the cyclic storage means has a time delay of thirty-one bit times of the first device when the HP signal is at the positive voltage level. For each circulation of the data in this thirty-one bit time delay path a different bit of the data will be transferred to latch 62 during bit time B1–0 by timing signals BB0 and CC1. Under these conditions a complete word of thirty-two bits would have been available in serial fashion in latch 62 upon thirty-two circulations of the data in the cyclic storage means. Each data bit of the word would be maintained in the latch for one word time of the first device and these bits would be presented at a rate equal to an even binary division of the operating rate of the first device. The rate of operation of latch 62 under these conditions would be approximately 1.5625 kilocycles per second. However, an examination of FIGURE 5 of the drawings will show that the HP signal is not at the positive level continuously for thirty-two word times of the first device but rather is at this level for two out of three word times. The effect of this operation will be hereinafter more fully explained.

When the HP signal is at the binary zero level and data is circulated in the cyclic storage means, a thirty-two bit time delay is provided. As long as the cyclic storage means has an effective time delay equal to one word time of the first device, the same bit of binary information is transferred to latch 62 during each word time. The HP signal varies in accordance with a preselected pattern throughout a data transfer operation. The effective time delay or length of the delay device is cyclically changed so that the bits of the data to be transferred are presented at the proper times to latch 62.

The output signals HX and $\overline{HX}$ of latch 62 represent a coarse translation between the operating speed of the first device and the operating speed of the second device. A fine or vernier timing translation is accomplished by latch 65 whose output signal HNRZ is supplied directly to the second device operating at the 1.042 kilocycle rate. The set input of latch 65 is driven through Or block 66 by the outputs of And blocks 67 and 68. And block 67 combines the HX signal with the timing signals BT11, $\overline{GTH1}$, BB13 and CC3 while the inputs to And block 68 are defined by signals HX, BT11, GTH1, BB29 and CC3. The reset input of latch 65 is energized through Or block 69 by the outputs of And blocks 70 and 71. The inputs to the And blocks 70 and 71 are the same as those applied to And blocks 67 and 68, respectively, with the exception that the $\overline{HX}$ signal is employed. A double line transfer occurs between the latches 62 and 65.

Figure 5:
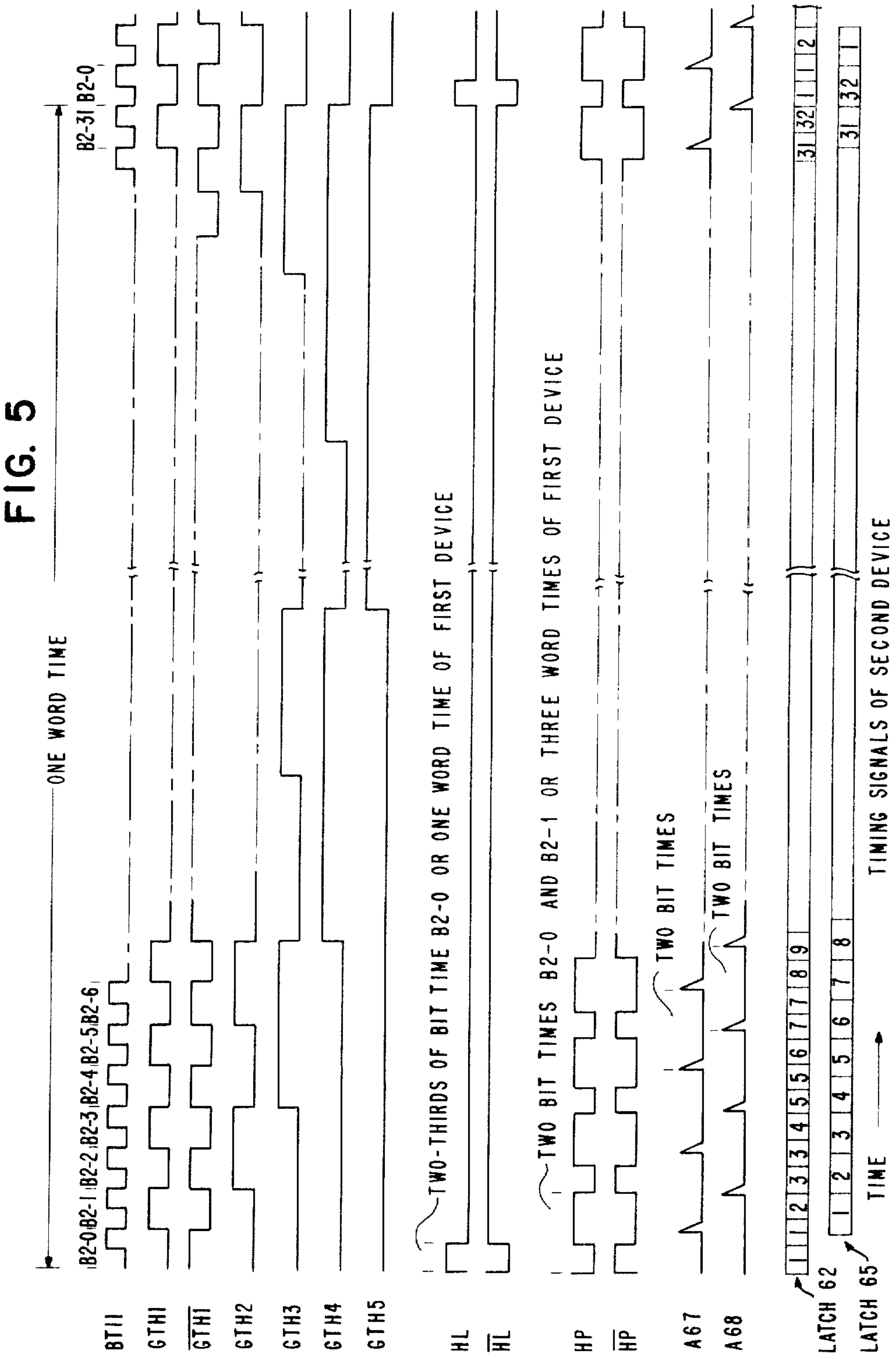
FIGURE 5 is a timing chart showing timing signals of the second device and graphically illustrating the operation of certain portions of the data transferring apparatus.

The latch 65 is energized at exactly the rate of operation of the second device or 1.042 kilocycles per second. Providing the signal HX is at the positive voltage level, the And blocks 67 and 68 will be enabled alternately at two bit time intervals as is shown in FIGURE 5 of the drawings. The output signal A67 from the And block 67 is a positive pulse occurring slightly before the end of bit time B2–0 and the even numbered bit times of the second device. Signal A68 provides a positive pulse near the end of the odd numbered bit times of the second device. Whenever the $\overline{HX}$ signal is at the positive level and And blocks 70 and 71 are energized in exactly the same manner as And blocks 67 and 68, respectively. The information in latch 62 is transferred to the latch 65 at the rate of operation of the second device near the end of each bit time of this device. The latch 65 and the gating circuitry associated therewith perform a fine or vernier timing translation between the latch 62 and the second operating device.

*Operation.*—Considering now the operation of the apparatus above described, it will be assumed that initially there is no data circulating in the cyclic storage means. During bit time B2–0 (corresponding to one word time of the first device) the HL signal is at the positive level and data from either the first memory 25 ($\overline{YMBR}$) or the second memory 26 (WMBR) of the first device (as controlled by the internal timing of the first device) is introduced into the transferring apparatus at the rate of the first device. The HP signal is at the binary zero level at this time whereby the thirty-two bits of information are transmitted via And block 54, Or block 43 and inverter 44 and are loaded into the delay device 20. Near the end of the first word time of the first device (B2–0), the first or synchronizing bit will be in latch 39, the second through the thirty-first bits will be in the cyclic storage means provided by the delay device 20 and latch 33 and the thirty-second or parity bit will appear in latch 52.

When the data from the first device is introduced into the transferring apparatus from the first device, the first bit is immediately transferred to latch 62 and is temporarily stored therein. A representation of the various bits in the latches 62 and 65 during a transfer operation is shown in FIGURE 5 of the drawings. The time offset of the information in the latch 65 with respect to the binary bits appearing in latch 62 is due to the gating circuitry for the latch 65 and results in the data being presented to the second device at exactly the rate of operation thereof.

At the end of one word time of the first device (two-thirds of bit time B2–0), the data has been loaded into the transferring apparatus and the HP signal goes to the positive level for the next two word times of the first device. This corresponds to the last third of bit time B2–0 and all of bit time B2–1 of the second device. The first or synchronizing bit of the data is in latch 39 and will be transferred via latch 52 to latch 62. A short time later either And block 67 or And block 70 will be enabled and the first bit is then in latch 65 and is available to the second device.

The HP signal enables And block 42 whereby the effective time delay or length of the cyclic storage means is decreased from one complete word time to thirty one bit times of the first device. The first or synchronizing bit is in latches 39 and 52 when the HP signal goes to the positive level whereby bits two through thirty-one pass through And block 42 and circulate in the thirty-one bit time cyclic storage means. At the end of the second word time of the first device (corresponding to the first third of bit time B2–1), the second bit of binary information appears in latch 33 and is transferred to latches 39 and 52. At the beginning of the next word time of the first device the latch 52 is interrogated by timing signal BB0 and the second bit appears in latch 62. A short time thereafter and near the end of bit time B2–1 the And block 68 or And block 71 is energized and the second bit is transferred to the second device by latch 65.

The HP signal is still at the positive level so that the data continues to circulate in the thirty-one bit time delay path at the fifty kilocycle rate. At the end bit time B2–0 the third bit of binary information appears in proper timed relation with respect to the timing signal BB0 and is transferred to latch 62. It will be noted that as long as the HP signal is at a positive level and the cyclic storage means has an effective delay which is one bit time less than the total bits of the information to be transferred, successive bits of information will be made available to the second device once each word time of the first device.

The HP signal returns to the binary zero level at the end of bit time B2–1 so that the thirty-two bit time delay path is reestablished. The third bit of data will be immediately transferred to latch 62 upon the occurrence of the timing signal BB0. The HP signal again goes to the positive level after one word time of the first device. However, since the data has been circulating in a cyclic storage means having a thirty-two bit time delay, the third bit is again transferred to the latch 62. As long as a delay path equal in effective length to the length of the total data to be transferred is provided, the same bit of data will be available once each word of the first device to the second device. And block 67 or 68 is enabled near the end of bit time B2–2 and the third bit of data is introduced into the latch 65 at the rate of operation of the second device.

The effective time delay or length of the cyclic storage means is changed in accordance with a preselected pattern throughout a transferring operation. A thirty-one bit delay path is provided for two out of three word times of the first device and a thirty-two bit time delay path is provided for the other word time. The arrangement is such that the odd numbered bits of the data appear in latch 62 for two word times of the first device and one and one-half bit times of the second device. The even numbered bits of data remain in this latch for one word time of the first device and two-thirds of a bit time of the second device. The latch 62 is interrogated at a rate corresponding to the rate of operation of the second device so that the data is available at the proper rate and in a serial manner to the second device.

After a complete word time of the second device, the data has been transferred to the latch 65 and the transferring apparatus is again ready to complete another transfer opertaion. The time required to complete a transfer is extremely short and corresponds exactly to the rate at which the low speed device can accept or supply the data. Also, the first bit of the data is available to the second device approximately one bit time of the second device after a transfer operation is initiated by loading the data into the cyclic storage means.

*Second embodiment*

Figure 6:
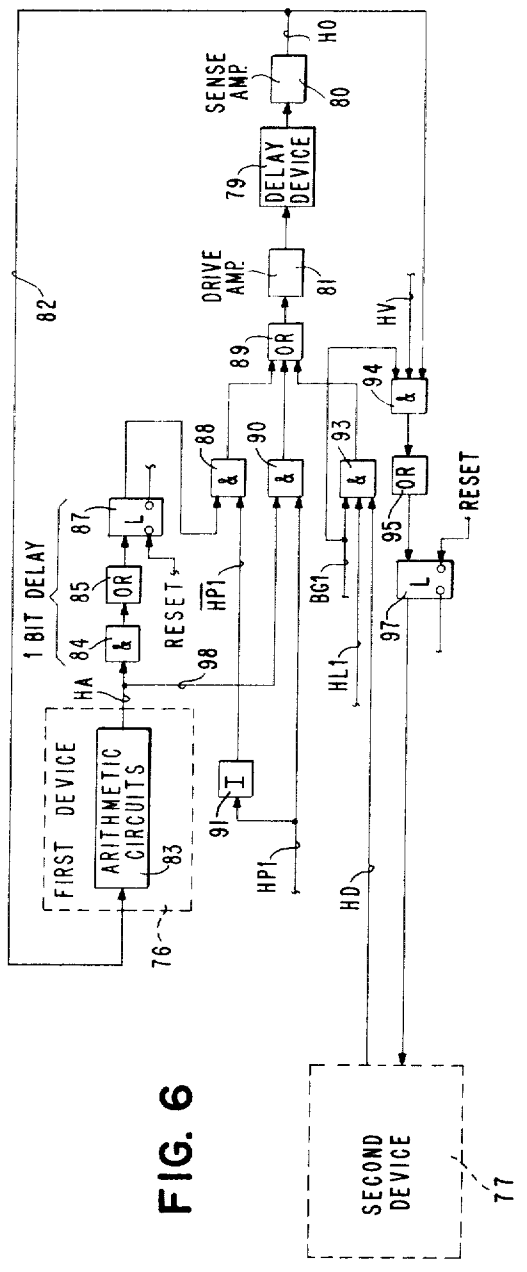
FIGURE 6 is a schematic block diagram of second data transferring apparatus embodying the teachings of the invention.

A second embodiment of the invention is shown in FIGURE 6 of the drawings. The data transferring apparatus forms an integral part of a first device 76 operating at a first speed and interconnects the same with a second device 77 operating at a second speed. The second device communicates in both directions with the first device. The first device may be a digital differential analyzer adapted to solve a particular differential equation or equations while the second device may comprise a storage means adapted to load initial values into one register of the digital differential analyzer and to verify the information contained in this register. For purposes of illustration, it will be assumed that the first device operates at a one megacycle bit rate and the second device operates at a two kilocycle bit rate.

The cyclic storage means of the data transferring apparatus comprises a magnetostrictive delay line 79 and associated sense and drive amplifiers 80 and 81 positioned at the opposite ends thereof. The delay device 79 serves not only as a portion of the data transferring apparatus but also as one of the registers for the digital differential analyzer or first device 76. For example, the delay device may be the *y* register of the first device.

The output signal HO from the sense amplifier 80 is routed over conductor 82 and through the arithmetic circuits 83 of the first device. The output of the arithmetic circuits or signal HA is coupled through And block 84 and Or block 85 to the set input of latch 87. The latch 87 provides one input to And block 88 which in turn energizes the drive amplifier 81 via Or block 89. The other input to And block 88 is the command signal $\overline{\text{HP1}}$ whose use will be hereinafter more fully explained. Providing the command signal $\overline{\text{HP1}}$ is at the positive level, the binary information in the delay device 79 will appear in sense amplifier 80 and then be transmitted over a circuit including conductor 82, arithmetic circuits 83, And block 84, Or block 85, latch 87, And block 88 and Or block 89 to the drive amplifier 81 where this data is reintroduced into the delay device 79. This path has a time delay or effective length equal to 500 bit times of the first device. This 500 bit time delay also represents the bit capacity of the *y* register of the first device.

A circuit path including a conductor 98 and And block 90 is connected in parallel relation about the latch 87 between the arithmetic circuits 83 and the Or block 89. The remaining input to And block 90 is the command signal HP1 which is supplied by either the first or the second device. The HP1 signal is passed through an inverter 91 to provide the command signal input to And block 88. The latch 87 and its associated gating circuitry represent a time delay of one bit time of the total time delay of 500 bit times of the cyclic storage means. The arrangement is such that when the HP1 signal is at the positive level, the cyclic storage means has a time delay equal to 499 bit times of the first device. The effective time delay or length of the cyclic storage means is changed in response to the command signal HP1.

Data from the second device (as represented by the signal HD) is introduced into the cyclic storage means and the first device by way of And block 93 and Or block 89. The And block 93 combines a load command signal HL1, a timing signal BG1 and the data signal HD. The timing signal BG1 is at the positive or binary one voltage level once each 500 bit times of the first device. Since the first device operates at a one megacycle rate, the timing signal BG1 is at the positive or binary one level during each bit time of the second device which operates at a two kilocycle rate.

The signal H0 coming from the sense amplifier 80 is also supplied to an And block 94. The other inputs to this And block are the timing signal BG1 and the command signal HV. This latter signal is at the positive level whenever it is desired to transfer data from the high speed first device to the low speed second device. The output of And block 94 is applied through Or block 95 to the set input of a readout latch 97. The latch 97 is coupled directly to the second device 77. Reset signals are provided for latches 87 and 97 whereby the latch 87 is reset once each bit time of the first device while the latch 97 is reset once each bit time of the second device.

*Operation.*—Considering now the operation of the apparatus described immediately above, it will be assumed that there is no data in the cyclic storage means and it is desired to load a set of values into the *y* register of the digital differential analyzer or first device in preparation for a series of computations. The HL1 signal is at the binary one level and once each bit time of the second device (corresponding to 500 bit times of the first device) the And block 93 is enabled in accordance with the binary information contained in the data signal HD. The binary information is transferred through And block 93, Or block 89 and drive amplifier 81 to the delay device 79.

The HP1 command signal is at the binary one level so that the data circulates through the conductor 98 and And block 90. The cyclic storage means has a time delay equal to one bit time less than the number of bits to be introduced into the *y* register of the first device. Data is introduced into the delay device at a two kilocycle rate so that data in the cyclic storage means appears to be shifted to the right for each circulation of the data. The data is introduced into the cyclic storage means in serial fashion at the operating rate of the second device.

As soon as the 499th bit has been introduced into the delay device, HP1 signal goes to the binary zero level so that And block 90 is de-energized and And block 88 is enabled. The latch 87 and its gating circuitry are now in the delay path and the cyclic storage means has an effective storage capacity of 500 bits. The last or 500th bit is now loaded into the delay line and the HL1 command signal returns to the binary zero level to complete a loading operation. The cyclic storage means is loaded to its maximum capacity although during the greater portion of the loading operation this means has a length or time delay which is less than this capacity.

The first device or digital differential analyzer is now ready to begin computations with the data in the cyclic storage means circulating through the arithmetic circuits 83 at the rate of operation thereof or one megacycle. Such computations are under the control of the control means and timing means of the first device, not shown. It should be understood that the first device would comprise additional registers, also not shown, for storing other quantities.

At certain times it may be desirable to verify the information contained in the *y* register of the first device and this is accomplished by causing the HP1 and HV command signals to go to the positive or binary one level. Once each bit time of the second device a bit of binary information is gated into the latch 97 and transferred to the second device. The cyclic storage means now has an effective length of 499 bit times of the first device. A different bit is transferred to the second device for each circulation of the data in this delay path.

The HP1 signal is raised to the positive level immediately after a readout operation has been initiated and the first bit is in the latch 87. The latch 87 is not in the delay path during the remainder of the operation and the first bit of binary information is stored therein. As soon as all 500 bits have been transferred to the second device, the HP1 signal returns to the binary zero level at a proper time to gate the first bit of information into the train of information in its proper position. The cyclic storage means now has an effective time delay equal to 500 bit times of the first device.

It will be noted that at the end of a readout operation, the data is still available in proper sequence in the cyclic storage means. This result is accomplished even though the length of the cyclic storage means is effectively decreased during such an operation. The latch 87 is used to store one bit of data and is gated in such a manner that no bits of data are lost or destroyed during a transfer operation.

*Third embodiment*

Figure 7:
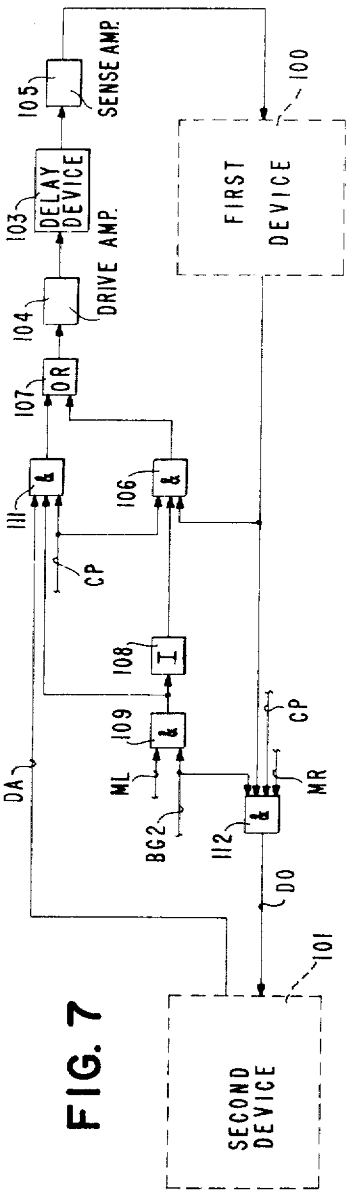
FIGURE 7 is a schematic block diagram of yet other data transferring aparatus constructed in accordance with and employing the teachings of the invention.

In FIGURE 7 of the drawings there is shown yet another embodiment constructed in accordance with the teachings of the present invention. The data transferring apparatus forms an integral portion of a first device 100 operating at a first rate and receives data from or transmits data to a second device 101 operating at a second rate. It will be assumed that the first device has a bit rate of approximately 750 kilocycles per second while the second device operates at 183 cycles per second.

The cyclic storage means is provided by a magnetostrictive delay line 103 and its associated drive and sense amplifiers 104 and 105. The output from the sense amplifier is returned through the first device 100, And block 106 and Or block 107 to the drive amplifier 104 where the same is reintroduced into the delay device. This cyclic storage means has a capacity of 4095 bits and operates at the rate of the first device. The And block 106 combines the output of the sense amplifier with a signal from inverter 108 and a timing signal CP. This latter signal is at the positive level during a portion of each and every bit time of the first device.

The inverter 108 is driven directly by the output of And block 109 whose inputs are timing signal BG2 and comand signal ML. The comand signal ML is at the positive or binary one level during a loading operation while the timing signal BG2 occurs once each bit time of the second device or once each 4096 bit times of the first device. Thus, And blcok 106 is enabled in accordance with the binary information coming from the sense amplifier at the rate of operation of the first device except during each bit time of the second device throughout a loading operation.

Data is loaded into the cyclic storage means through an And block 111 and Or block 107. And block 111 is driven by the timing signal CP, the output of And block 109 and a data containing signal DA suplied by the second device 101. Data (signal D0) is transmitted to the second device via And block 112 which combines the output of the sense amplifier 105, timing signals BG2 and CP and command signal MR. The command signal MR is at the binary one level only during a readout operation when data is transferred from the first device to the second device. As previously mentioned, the CP signal occurs each bit time of the first device while the BG2 signal is at the positive level during each bit time of the second device. Each bit time of the second device is equal to 4096 bit times of the second device.

*Operation.*—In describing the operation of this apparatus it will again be assumed that no information is in the cyclic storage means and it is desired to transfer data from the second device to the first device. At the beginning of a loading operation the command signal ML is raised to the positive level and And block 111 is enabled in accordance with the information supplied from the second device (signal DA) at the rate of operation of the second device (183 cycles per second). The cyclic storage means has a capacity of 4095 bits so that the data therein appears to be shifted one bit position with respect to the rate of operation of the second device for each circulation of the data through the cyclic storage means. Every 4096 bit times of the first device a new bit of data is introduced into its proper position in the cyclic storage means. The bits are sequentially stored in the cyclic storage means in the same order in which they are transmitted from the second device. The loading operation continues until the cyclic storage means has been filled to capacity.

To effect a transfer of the data in the cyclic storage means to the second device, command signal MR is raised to a positive level and once each bit time of the second device (corresponding to 4096 bit times of the first device) a bit of data is gated through And block 112 to the second device. This operation continues until all 4095 bits in the cyclic storage means have been transferred to the second device.

Data can be transferred between the first and second devices in both directions simultaneously. The reading operation starts at the same time as the loading operation. Thus, as a bit of data is transferred from the cyclic storage means to the second device, it is immediately replaced with a new bit of information coming from the second device.

It is possible to obtain reading and loading rates which are any even binary divisions of the operating rate of the first device. For example, if the second device operates at 366 cycles per second, the BG2 signal will be at the positive or binary one level every 2048 bit times of the first device. Under these conditions, the first bit of data introduced into the cyclic storage means will appear in bit position 1, the second bit will appear in position 2049, the third bit will appear in position 2, the fourth bit will appear in position 2050, the fifth bit in position 3, the sixth bit in position 2051, etc. Providing the reading operation occurs at a 366 cycle per second rate (corresponding to 2048 bit times of the first device) the bits are presented in their proper sequence to the second device.

The above arrangement is particularly advantageous since only the time signal BG2 need be changed to obtain loading and reading rates equal to any even binary division of the rate of operation of the first device. For example, when the first device has an operating rate of approximately 750 kilocycles, loading and reading rates of 750 kilocycles per second, 375 kilocycles per second, 187 kilocycles per second, 93.8 kilocycles per second, etc., down to a minimum of 183 cycles per second can be obtained. Further, means for changing the effective time delay or length of the cyclic storage means and a translation means such as shown and described in connection with the first embodiment of the invention can be employed to provide other transfer rates.

Data can be transmitted to and from the first device at different rates. This is accomplished by energizing And block 109 with a first timing signal corresponding to BG2 which is a first even binary division of the rate of operation of the first device and the And block 112 with a second timing signal corresponding to BG2 which is another even binary division of the rate of operation of the first device. Assuming that the loading of the data occurs in a sequential manner at a 366 cycles per second rate and the reading operation takes place at a 183 cycles per second rate, the bits of data gated out through And block 112 will be rearranged. The bits will appear in the following order with respect to the bit positions they occupied in the cyclic storage means—1, 3, 5 . . . 4095, 2, 4, 6 . . . 4094. However, if this is objectionable, the bits of data can be loaded in a pattern (1, 2049, 2, 2050, 3, 2051 . . . 4095) so that the same will be in sequence during a reading operation under these conditions.

A similar analysis can be performed on any combination of loading and reading rates providing the same are even binary divisions of the operating rate of the first device. A system can be constructed where a second device operating at a second rate loads information into a cyclic storage means forming an integral portion of a first device operating at a first rate and a third device operating at a third rate receives information from the cyclic storage means. Providing the rates of operation of the second and third devices are different, one of these devices will receive or transmit data in scrambled form. This may be highly desirable in certain instances, such as in a cryptographic system, or additional translation equipment can be used with the device receiving or transmitting the scrambled data.

The And block 106 is energized by the output of the sense amplifier 105, timing signal CP and a signal from inverter 108. As long as the ML signal is at the binary zero level the data circulates in the cyclic storage means. This circulation is not dependent on any of the timing or command signals other than signal CP. The loss of any timing or command signal, with the exception of CP, will not result in the loss of bits or in any other way affect the circulation of the data in the cyclic storage means.

*General discussion*

It should now be apparent that the objects initially set forth have been accomplished. Of particular importance is the provision of highly simplified and versatile apparatus for inter-connecting a pair of data processing devices operating at different rates. Almost an unlimited number of rate translations can be accomplished by the use of coarse translation means and fine timing translation means in combination with means to change the effective length or time delay of the cyclic storage means in accordance with a preselected pattern.

For example, in the first embodiment of the invention, if a read out rate of 12.5 kilocycles is desired, then the output of the latch 62 would be gated at the 12.5 kiloycycle rate when the cyclic storage means has an effective length equal to thirty-one bit times of the first device. A toal of eight bits would be gated out for each circulation of the data in the cyclic storage means. Each transfer operation would be completed in four circulations of the data through the cyclic storage means with the data being effectively shifted by one bit position for each circulation. The information supplied from the first device (signal YMBR or WMBR) can be arranged so that the data is read out in the proper order. Bit B0 would be in bit position one, B1 in bit position five, B2 in bit position nine . . . B8 in bit position two . . . and B31 in bit position thirty-two. The HP signal would remain at the positive level throughout a transfer operation.

The cyclic storage means may be an integral portion of one of the data processing devices and used on a time shared basis for transferring data and performing other functions within the device. A transfer operation is completed in a minimum of time since each bit of data being transferred is available at exactly the right instant.

While the invention has been particularly shown and described with reference to preferred embodiments thereof, it will be understood by those skilled in the art that the foregoing and other changes in form and details may be made therein without departing from the spirit and scope of the invention.

What is claimed is:

In a data processing system, means for transferring serial trains of digital information between first and second devices, each of said first and second devices being operable at different first and second bit rates, each of said trains representing a word length composed of a predetermined plural number of bit intervals, said means comprising:

first And gate means coupled between the output of said first device and the input of said second device, second And gate means coupled to the output of said second device, delay means operable at a bit rate equal to said first bit rate and having an output coupled to the input of said first device, third And gate means coupled to the output of said first device, Or gate means having first and second inputs coupled respectively to the output of said second And gate means and the output of said third And gate means, first means for periodically actuating said second And gate means at said second bit rate to pass therethrough the data bits of a serial train from the second device to said delay and first devices, one data bit of the serial train from said second device being passed during each actuation of said second And gate means, second means for periodically actuating said first And gate means at said first bit rate to pass therethrough the data bits of a serial train from said first device for recirculation thereof through said delay and first devices, one data bit of the serial train from said first device being passed during each actuation of said first And gate means, and third means for periodically actuating said third And gate means at said second bit rate to pass therethrough the data bits of a serial train from said first device to said second device, one data bit of the serial train from said first device being passed during each actuation of said third And gate means, said first, second and third gate means being actuated by their respective said actuating means to allow the data bits to be transferred between the first and second devices simultaneously.

References Cited by the Examiner

UNITED STATES PATENTS

| | | | |
|---|---|---|---|
| 2,978,680 | 4/1961 | Schulte | 340—172.5 |
| 3,013,254 | 12/1961 | Walker | 340—172.5 |
| 3,024,993 | 3/1962 | Wright et al. | 340—172.5 |
| 3,064,241 | 11/1962 | Schneider | 340—172.5 |
| 3,122,726 | 2/1964 | King et al. | 340—172.5 |
| 3,144,638 | 8/1964 | Hester et al. | 340—172.5 |

ROBERT C. BAILEY, *Primary Examiner.*

MALCOLM A. MORRISON, *Examiner.*

W. M. BECKER, P. J. HENON, *Assistant Examiners.*